United States Patent
Koehler et al.

(10) Patent No.: US 8,950,795 B2
(45) Date of Patent: Feb. 10, 2015

(54) ROBOTIC GRABBER AND METHOD OF USE

(71) Applicant: Raytheon Company, Waltham, MA (US)

(72) Inventors: Frederick B. Koehler, Tucson, AZ (US); Ward D. Lyman, Tucson, AZ (US); Terry M. Sanderson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 155 days.

(21) Appl. No.: 13/863,634

(22) Filed: Apr. 16, 2013

(65) Prior Publication Data

US 2014/0306473 A1    Oct. 16, 2014

(51) Int. Cl.
*B66C 1/44* (2006.01)
*B25J 15/00* (2006.01)
*B25J 15/12* (2006.01)
*F03G 7/06* (2006.01)

(52) U.S. Cl.
CPC ............... *F03G 7/065* (2013.01); *B25J 15/12* (2013.01); *Y10S 901/31* (2013.01)
USPC ........................ 294/86.4; 294/103.1; 901/31

(58) Field of Classification Search
USPC ............ 294/86.4, 99.1, 192, 196, 197, 103.1, 294/207, 119.1, 902; 310/363–367; 901/30, 901/31, 36, 39
See application file for complete search history.

(56) References Cited

U.S. PATENT DOCUMENTS

| | | | | |
|---|---|---|---|---|
| 4,610,475 A | * | 9/1986 | Heiserman | 294/86.4 |
| 4,666,198 A | * | 5/1987 | Heiserman | 294/86.4 |
| 4,667,997 A | * | 5/1987 | Udagawa et al. | 294/86.4 |
| 6,795,296 B1 | * | 9/2004 | Palanduz et al. | 361/311 |
| 8,026,773 B2 | * | 9/2011 | Zhu et al. | 333/32 |
| 2011/0089708 A1 | * | 4/2011 | Mankame et al. | 294/86.4 |

* cited by examiner

*Primary Examiner* — Paul T Chin
(74) *Attorney, Agent, or Firm* — Renner, Otto, Boiselle & Sklar, LLP

(57) ABSTRACT

A robotic finger includes a shape-memory alloy and a shape-memory polymer connected to and adjacent to the shape-memory alloy. Heating the shape-memory polymer causes it to soften, heating the shape-memory alloy causes the alloy to bend in the direction of the shape-memory polymer to press the shape-memory polymer against an object to be grasped, and cooling the shape-memory polymer causes it to stiffen and to retain its shape. An opposing member is positioned to cooperate with the finger to grasp an object positioned between the finger and the opposing member. A selectively controllable heat source is capable of applying heat to the finger.

8 Claims, 2 Drawing Sheets

ROBOTIC GRABBER AND METHOD OF USE

FIELD OF THE INVENTION

The present invention concerns a component of a robotic hand for grasping objects and a method of its use.

BACKGROUND

In the continued advancement of robotics, many techniques have been tried that allow robots to pick up or hold onto objects. These techniques typically are incorporated into a device alternatively called a gripper or a grabber or a hand. The latter term is sometimes used even when it does not look or function like a human hand. For our purposes, the term "hand" means anything that can grasp an object. Some robotic hands have two or more fingers between which an object can be grasped, and various techniques have been employed to provide the proper gripping force without damaging the object in the robot's grasp.

Most robotic hands are controlled by a computer, which requires careful programming to tell the robot how to grasp an object and how hard to hold it without dropping or crushing it. Different shapes and fragilities of objects can require different programming.

SUMMARY OF THE INVENTION

Some applications for robotic hands have arisen that require very low or no power once an object has been grasped; particularly where a robot needs to carry its own power supply. This is a significant problem for smaller robots, which have limited capacity for carrying a long-lasting power supply.

The present invention solves this problem using shape-memory materials. Shape-memory alloys are metals that can be formed into a desired shape, and then deformed out of that shape. When heated, the alloy returns to the desired shape. Shape-memory polymers are polymeric materials that typically are stiff at a relatively low temperature, and softer and more pliable at a higher temperature. The present invention uses the fact that shape-memory polymers can retain their shapes at a given temperature without requiring any power in a robotic finger that can hold its position without any power required to hold it in that position.

More particularly, the present invention provides a robotic finger that includes a shape-memory alloy and a shape-memory polymer connected to and adjacent to the shape-memory alloy. Heating the shape-memory polymer causes it to soften. Heating the shape-memory alloy causes the alloy to bend in the direction of the shape-memory polymer to press the shape-memory polymer against an object to be grasped, and cooling the shape-memory polymer causes it to stiffen and to retain its shape.

The robotic finger can be incorporated into a hand, which includes an opposing member positioned to cooperate with the finger to grasp an object positioned between the finger and the opposing member. The finger and the opposing member can form a U-shape.

The finger also can be combined with a selectively controllable heat source capable of applying heat to the finger.

The finger also can include: (a) an insulation layer between the shape-memory alloy and the shape-memory polymer that thermally isolates the shape-memory alloy from the shape-memory polymer; (b) a heating element that can heat the shape-memory alloy and the shape-memory polymer, and a control unit capable of selectively controlling the heating element; (c) at least two heating elements adjacent the shape-memory polymer at longitudinally-spaced locations; (d) at least two heating elements adjacent the shape-memory alloy at longitudinally-spaced locations.

According to another aspect of the invention, the shape-memory alloy is a first shape-memory alloy, and the finger further includes a second shape-memory alloy thermally isolated from the first shape-memory alloy, where the action of the second shape-memory alloy is in opposition to the action of the first shape-memory alloy. This allows the finger to be bent and straightened by selectively heating the first shape-memory alloy and the second shape-memory alloy when the shape-memory polymer is in a softened or rubbery state.

The present invention also provides a method of grasping an object comprising the steps of: (a) positioning the finger adjacent an object to be grasped; (b) heating the shape-memory polymer; (c) heating a shape-memory alloy after the shape-memory polymer heating step has begun to press the shape-memory polymer against the object to be grasped; and (d) stopping the heating of the shape-memory alloy a sufficient time after stopping the heating of the shape-memory polymer to allow the shape-memory polymer to stiffen.

Alternatively, the present invention provides a robotic grabber that includes a shape-memory polymer arranged to engage an object to be grasped, a shape-memory alloy arranged to manipulate the shape-memory polymer relative to the object to be grasped, and a source of heat selectively controlled to apply heat to the shape-memory polymer and the shape-memory alloy to manipulate the shape-memory alloy to push the shape-memory polymer against the object to be grasped.

The present invention also provides a clamping device that includes a first jaw and a second jaw opposing the first jaw. The first jaw includes a shape-memory alloy and a shape-memory polymer connected to the shape-memory alloy such that the shape-memory polymer faces the second jaw. Heating the first jaw causes the shape-memory alloy to move relative to the second jaw to open or close the jaws relative to one another, and heating the shape-memory polymer causes the polymer to move from a rigid state to a pliable state to facilitate grasping an object between the jaws.

As a further alternative, the present invention provides a robotic finger that includes (a) a shape-memory polymer that is relatively pliable at a first temperature and is relatively stiff at a second temperature that is lower than the first temperature; (b) a shape-memory alloy connected to the shape-memory polymer that has a first shape at a third temperature and moves to assume a second shape at a fourth temperature that is higher than the third temperature; (c) at least one heating element that can apply heat to the shape-memory polymer or the shape-memory alloy; and (d) a controller connected to the at least one heating element to selectively control the at least one heating element to apply heat to the shape-memory alloy or the shape-memory polymer to selectively change the state of the shape-memory alloy or the shape-memory polymer.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

DETAILED DESCRIPTION

The present invention provides a robotic grabber or hand that requires no power to hold onto an object once the object has been grasped. The grabber provided by the invention is useful for providing a low-power way for a robot to pick up, carry, or manipulate an object, or for the robot to otherwise hold onto an object, such as a rung of a ladder, for example.

The present invention uses shape-memory materials in a robotic hand to grasp objects of different shapes and degrees of fragility without requiring complex programming to do so. A shape-memory alloy has a memory such that when it is at a higher temperature it remembers a shape that it had at the higher temperature and attempts to return to that shape. Shape-memory alloys are metals that can be formed into a desired shape, and then deformed out of that shape. When heated above a transition temperature, the alloy returns to the desired memory shape, sometimes gently, and in some cases with significant force and speed. At a lower temperature, a shape-memory alloy is softer or more relaxed. Shape-memory polymers are polymeric materials that typically are stiff and hard at a relatively low temperature, and softer and more pliable and rubbery at a higher temperature above a transition temperature. The present invention uses the fact that shape-memory polymers can retain their shape at a relatively lower temperature without requiring any power.

One type of shape-memory alloy includes an alloy of copper, aluminum, and nickel, but many different types of shape-memory alloys are known and could work in the present invention. Nickel-titanium alloys are most common. Many different types of polymers; including acrylic, urethane, and epoxy formulations; can be made to function as shape-memory polymers. The shape-memory polymers used in the present invention are of a type that soften or become more flexible when heated. The temperature at which a shape-memory alloy or shape-memory polymer changes shape varies with the particular materials involved, but preferably is higher than expected ambient temperatures. The temperature at which the shape-memory alloy is activated to change shapes, referred to as the austenite finish temperature, can be different from the temperature at which the shape-memory polymer changes stiffness, referred to as the glass transition temperature, but those temperatures preferably are similar but not identical. Transition temperatures can vary from −100 C to 350 C, depending on the material and conditions.

Figure 1:
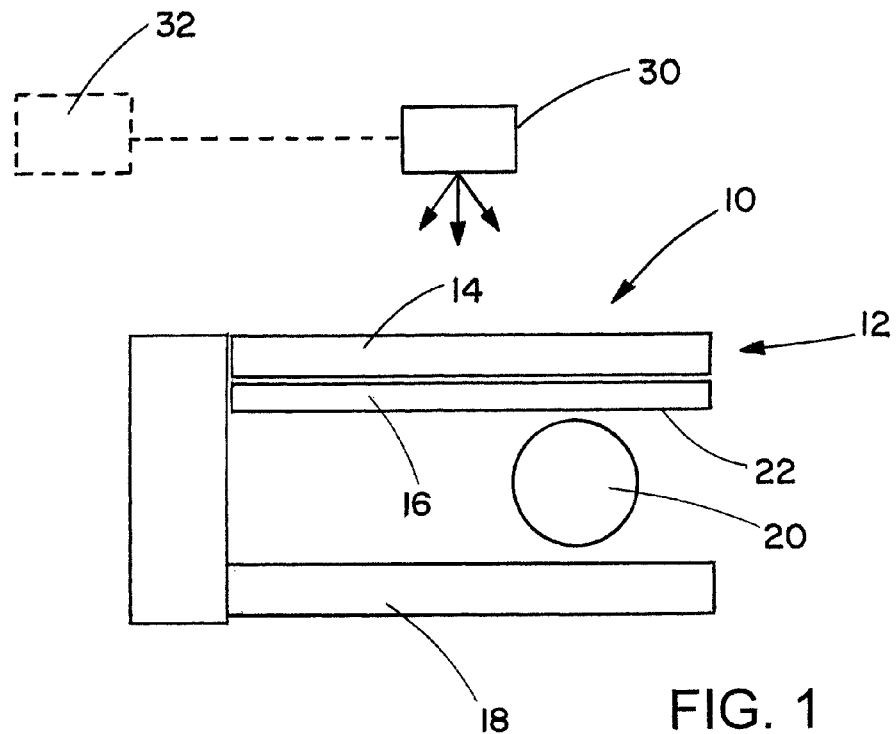
FIG. 1 is a schematic illustration of a robotic grabber provided in accordance with the present invention in a first position.
Figure 2:
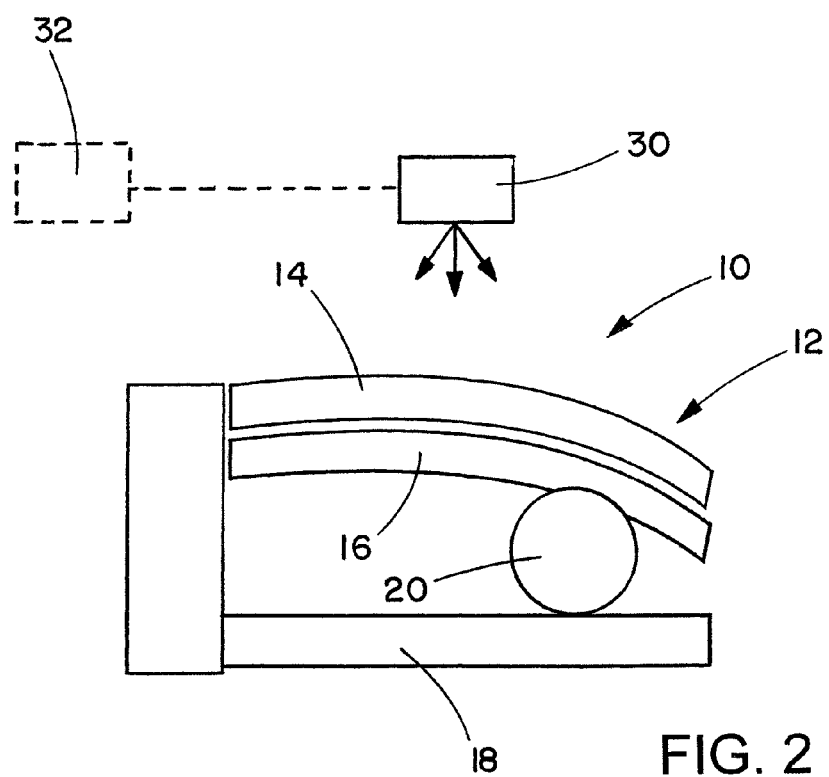
FIG. 2 is a schematic illustration of the grabber of FIG. 1 in a second position.

Referring now to the drawings and initially FIGS. 1 and 2, an exemplary grabber 10 provided in accordance with the present invention is shown. In this particular embodiment, the present invention provides a robotic grabber 10 with a finger 12 that includes a shape-memory alloy 14 and a shape-memory polymer 16 connected to the shape-memory alloy 14. The shape-memory alloy 14 and the shape-memory polymer 16 can be bonded together intermittently or continuously along a length of contact between them, tied together by an external element, or maintained within a common enclosure.

In the illustrated embodiment, the shape-memory alloy 14 and the shape-memory polymer 16 are coextensive. One material may be wider or longer than the other, however. This finger 12 is opposed by another member 18 such that the finger 12 can pinch and hold onto an object 20 that is positioned between the finger 12 and the opposing member 18. The opposing member 18 in this embodiment does not move, but a movable opposing member would work here as well.

The shape-memory materials 14 and 16 are arranged such that the shape-memory polymer 16 faces the opposing member 18, presenting a gripping surface 22 toward the opposing member 18 and an object 20 to be grasped therebetween. Heating the shape-memory alloy 14 causes the alloy 14 to bend in the direction of the shape-memory polymer 16 and the opposing member 18 as it attempts to return to its memory shape. The length of heating time until the transition temperature is reached varies by material and type of heating applied, but generally the heating time until activation is often less than five seconds. Shape-memory alloys can be heated more quickly, often less than one second, e.g., than shape-memory polymers (generally closer to five seconds). Time to cool below the transition temperature is about five times slower for shape-memory alloys, and ten times slower for shape-memory polymers.

When the shape-memory polymer 16 is heated it softens and allows the heated shape-memory alloy 14 to press the shape-memory polymer 16 against the object 20 to be grasped. The softness of the shape-memory polymer 16 allows the gripping surface 22 of the shape-memory polymer 16 to mold itself against the surface of the object 20 to be grasped. When the heat is removed, the shape-memory alloy 14 will relax as it cools. In contrast, the shape-memory polymer 16 will stiffen and retain its shape as it cools, thereby holding the object 20 without the application of any further energy to do so.

The object 20 can be removed from the grasp of the finger 12 and the opposing member 18 by reheating the shape-memory polymer 16, thereby softening it to allow the grabber 10 to disengage the object 20 being grasped. This can be done manually, or by using a spring (not shown) or other member to move the shape-memory alloy 14 and allow the grabber 10 to disengage the object 20.

In the illustrated embodiment, a heat source 30 applies heat to the entire finger 12. Such a heat source may include a torch, for example, or any other means for heating the shape-memory materials. The heat source 30 can be selectively controlled by a controller 32 that includes a processor. The controller 32 can be integral with the heat source 30 or can be remotely located and connected to the heat source 30 by a wireless or a wired connection.

Thus the grabber 10 can grip any object that can be received between the finger 12 and the opposing member 18, regardless of shape, without any changes in the controller programming. Alternatively, the finger 12 can operate on its own without an opposing member 18 by grabbing onto an object by wrapping itself partially or completely around the object, like some animals can do with their tails, foe example.

Figure 3:
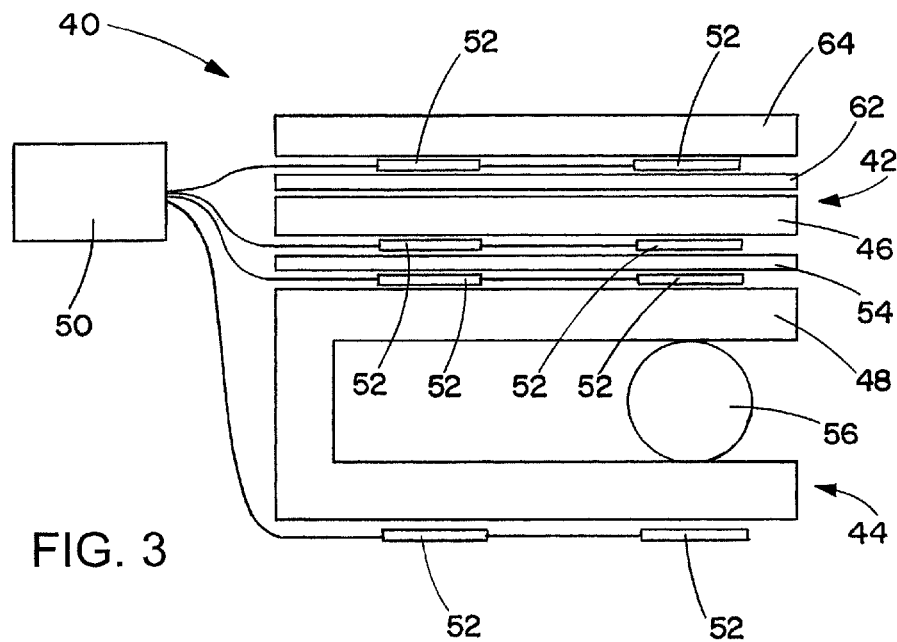
FIGS. 3 and 4 are alternative embodiments in a first and second position.
Figure 4:
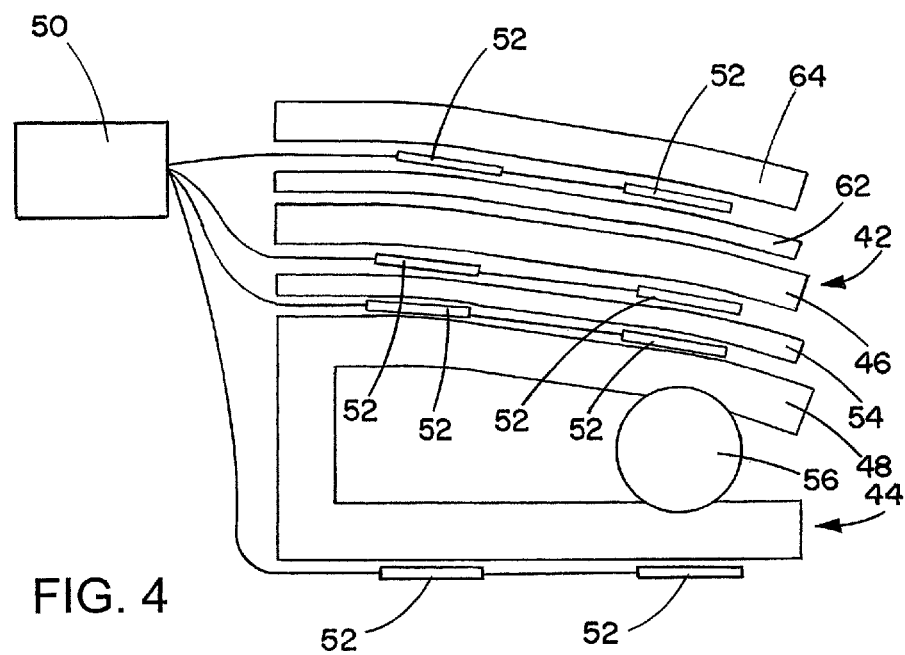

A further refinement of the concept provided by the present invention is shown in FIGS. 3 and 4. In this embodiment, the robotic grabber, which also could be considered to be a clamping device 40, includes a first jaw 42 and a second jaw 44. The first jaw 42, like the finger 12 (FIG. 1) described above, includes a shape-memory alloy 46 and a shape-memory polymer 48 coextensive with the shape-memory alloy 46. Alternatively, one of the materials 46 and 48 can be longer or wider than the other. A controller 50 controls multiple heating elements 52 spaced along the length of the shape-memory alloy 46 and the shape-memory polymer 48. By longitudinally spacing the heating elements 52, less material needs to be heated and less power needs to be applied to provide the desired functions. Exemplary heating elements 52 can include resistance heaters, a nichrome wire heater, and the application of environmental heat.

An insulating layer 54 is positioned between the shape-memory alloy 46 and the shape-memory polymer 48 so that heat can be selectively applied to each. Separating the shape-memory alloy 46 and the shape-memory polymer 48 and their respective heating elements 52 allows the controller 50 to position the jaws 42 and 44 of the clamping device 40 around an object 56 to be grasped, and then heat the shape-memory polymer 48 from a first temperature, often an ambient temperature, to a higher second temperature to soften it. The controller 50 can then heat the shape-memory alloy 46 from a third temperature, which also can be an ambient temperature, to a higher fourth temperature after the shape-memory polymer heating step has begun to soften the shape-memory polymer 48. Heating the shape-memory alloy 46 to a higher temperature will cause it to move from a first shape at the third temperature to a second shape at the fourth temperature and press the softened shape-memory polymer 48 against the object 56 to be grasped. The heat being applied to the shape-memory polymer 48 is then discontinued, allowing the shape-memory polymer 48 to cool toward the ambient temperature and stiffen. Once the shape-memory polymer has cooled, the robotic grabber will continue to grasp the object even when no power is being provided. Thus once the shape-memory polymer 48 has cooled and stiffened, the force applied by the shape-memory alloy 46 is no longer needed, and the heat then can be discontinued from being applied to the shape-memory alloy 46, allowing it to cool and relax.

The amount of force applied by the shape-memory alloy 46 when it is heated to cause it to return to its memory shape may only need to be strong enough to press the softened shape-memory polymer 48 against the object 56. It may not be necessary for the shape-memory alloy 46 to apply a strong-enough force to pick up or hold onto the object 56 by itself.

In this embodiment the shape-memory polymer 48 generally has a U-shape structure, and the heating elements 52 are spaced to selectively heat different spaced-apart locations of the shape-memory polymer 48, including on an opposing side 60 of the U-shape. As can be seen in FIG. 4, it is only the areas of the shape-memory polymer 48 that are heated that soften and become flexible enough to bend and mold around the object 56 being grasped. This further reduces the energy needed to grasp the object 56, and the softened areas become relatively flexible joints between relatively stiffer lower-temperature areas of the shape-memory polymer 48.

The embodiment shown in FIGS. 3 and 4 also include a second insulation layer 62 on the previously-described shape-memory alloy 46, which we will now call the first shape-memory alloy 46. On the second insulation layer 62, the clamping device 40 has additional heating elements 52, and a second shape-memory alloy 64. This second shape-memory alloy 64 functions as a return spring, to counteract the movement of the first shape-memory alloy 46. The second shape-memory alloy 64 can be replaced by a spring, as suggested above.

To release an object 56 that has been grasped by the robotic grabber 10, the controller 50 will activate the proper heating elements 52 to apply heat to the shape-memory polymer 48 and 60 to soften it, and then activate the proper heating elements 52 to apply heat to the second shape-memory alloy 64. When the second shape-memory alloy 64 is heated, it will bend upward, away from the object 56 being grasped, returning the first shape-memory alloy 46 and the shape-memory polymer 48 to a position removed from the object 56 being grasped, as shown in FIG. 3. The grabber 10 can then be disengaged from the object 56 that had been grasped. The controller 50 can then disengage the heating elements 52 associated with the shape-memory polymer 48, allowing it to cool and stiffen. Finally, the controller 50 can disengage the heating elements 52 associated with the second shape-memory alloy 64, which will relax as it cools. The stiffened shape-memory polymer 48 will hold the shape-memory alloys 46 and 64 in place, keeping the grabber 10 in an opened, ready-to-grasp position, ready to grasp another object.

As should be apparent from the description and drawings, the present invention provides a device that can hold onto an object without any power required to maintain its grip on the object. An advantage of using less power to hold onto an object is that a robot with limited power, such as a mobile robot, can do more; it can extend the battery life for a mobile robot, for example. The flexible nature of the shape-memory polymer makes the device relatively easy to use, since no special programming is required for the device to grab onto objects with different shapes or degrees of fragility. Moreover, the device provided by the invention can be used in a variety of applications that might employ robotic hands or need a removable clamp.

In summary, with reference to FIG. 1, the present invention provides a robotic finger 12 that includes a shape-memory alloy 14 and a shape-memory polymer 16 connected to and adjacent to the shape-memory alloy 14. Heating the shape-memory polymer 16 causes it to soften, heating the shape-memory alloy 14 causes the alloy 14 to bend in the direction of the shape-memory polymer 16 to press the shape-memory polymer 16 against an object 20 to be grasped, and cooling the shape-memory polymer 16 causes it to stiffen and to retain its shape. An opposing member 18 is positioned to cooperate with the finger 12 to grasp an object 20 positioned between the finger 12 and the opposing member 18. A selectively controllable heat source 30 is capable of applying heat to the finger 12.

Although the invention has been shown and described with respect to a certain illustrated embodiment, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the illustrated embodiment of the invention.

What is claimed is:

1. A robotic finger, comprising
   a shape-memory polymer that is relatively pliable at a first temperature and is relatively stiff at a second temperature that is lower than the first temperature;
   a shape-memory alloy connected to the shape-memory polymer that has a first shape at a third temperature and moves to assume a second shape at a fourth temperature that is higher than the third temperature;
   at least one heating element that can apply heat to the shape-memory polymer and the shape-memory alloy; and
   a controller connected to the at least one heating element to selectively control the at least one heating element to apply heat to the shape-memory alloy or the shape-memory polymer to selectively change the state of the shape-memory alloy or the shape-memory polymer.

2. A hand comprising the finger as set forth in claim 1, and an opposing member positioned to cooperate with the finger to grasp an object positioned between the finger and the opposing member.

3. A hand as set forth in claim 2, where the finger and the opposing member form a U-shape.

4. A finger as set forth in claim 1, comprising an insulation layer between the shape-memory alloy and the shape-memory polymer that thermally isolates the shape-memory alloy from the shape-memory polymer.

5. A finger as set forth in claim 1, comprising at least two heating elements adjacent the shape-memory polymer at longitudinally-spaced locations.

6. A finger as set forth in claim 1, comprising at least two heating elements adjacent the shape-memory alloy at longitudinally-spaced locations.

7. A finger as set forth in claim 1, where the shape-memory alloy includes a first shape-memory alloy and a second shape-memory alloy thermally isolated from the first shape-memory alloy, where the action of the second shape-memory alloy is in opposition to the action of the first shape-memory alloy, whereby the finger can be bent and straightened by selectively heating the first shape-memory alloy and the second shape-memory alloy.

8. A method of grasping an object comprising the steps of positioning the finger of claim 1 adjacent an object to be grasped, heating the shape-memory polymer, heating the shape-memory alloy after the shape-memory polymer heating step has begun to press the shape-memory polymer against the object to be grasped, and stopping the heating of the shape-memory alloy a sufficient time after stopping the heating of the shape-memory polymer to allow the shape-memory polymer to stiffen.

\* \* \* \* \*